United States Patent
Yhann et al.

(10) Patent No.: US 7,719,546 B1
(45) Date of Patent: May 18, 2010

(54) PROCESSING ILLUSTRATIONS USING STORED INFORMATION

(75) Inventors: Stephan R. Yhann, Renton, WA (US); Dejan Markovic, Sunnyvale, CA (US); Alexandre S. Parenteau, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 232 days.

(21) Appl. No.: 11/772,007

(22) Filed: Jun. 29, 2007

Related U.S. Application Data

(63) Continuation of application No. 10/786,771, filed on Feb. 25, 2004, now Pat. No. 7,242,415.

(51) Int. Cl.
*G09G 5/00* (2006.01)

(52) U.S. Cl. .................................................. 345/629

(58) Field of Classification Search ................. 345/629, 345/624, 677, 646
See application file for complete search history.

(56) References Cited

U.S. PATENT DOCUMENTS

| | | | |
|---|---|---|---|
| 4,583,116 A | 4/1986 | Hennig et al. | |
| 4,931,861 A | 6/1990 | Taniguchi | |
| 5,029,115 A | 7/1991 | Geraci | |
| 5,113,249 A | 5/1992 | Yosefi | |
| 5,131,058 A | 7/1992 | Ting | |
| 5,295,236 A | 3/1994 | Bjorge et al. | |
| 5,313,570 A | 5/1994 | Dermer et al. | |
| 5,355,446 A | 10/1994 | Maayan | |
| 5,459,818 A | 10/1995 | Grant et al. | |
| 5,471,566 A | 11/1995 | Kirk | |
| 5,542,052 A * | 7/1996 | Deutsch et al. ............. | 345/589 |
| 5,613,046 A | 3/1997 | Dermer | |
| 5,666,543 A * | 9/1997 | Gartland ...................... | 715/205 |
| 5,668,931 A | 9/1997 | Dermer | |
| 5,715,331 A * | 2/1998 | Hollinger .................... | 382/199 |
| 6,031,544 A * | 2/2000 | Yhann ......................... | 345/620 |
| 6,049,339 A | 4/2000 | Schiller et al. | |
| 6,141,462 A | 10/2000 | Yoshino et al. | |
| 6,236,754 B1 * | 5/2001 | Harrington .................. | 382/199 |
| 6,345,117 B2 * | 2/2002 | Klassen ....................... | 382/167 |
| 6,366,361 B1 * | 4/2002 | Dermer et al. ............... | 358/1.9 |
| 6,594,030 B1 | 7/2003 | Ahlstrom et al. | |
| 6,654,145 B1 * | 11/2003 | Speck ......................... | 358/1.9 |

(Continued)

OTHER PUBLICATIONS

"How to trap using Adobe trapping technologies", Copyright 2002 Adobe Systems Incorporated, [online], [retrieved Aug. 8, 2006] Retrieved from the Internet: http://www.adobe.com/products/extreme/pdfs/trapping.pdf.

(Continued)

*Primary Examiner*—Ulka Chauhan
*Assistant Examiner*—Daniel Washburn
(74) *Attorney, Agent, or Firm*—Fish & Richardson P.C.

(57) ABSTRACT

Computer-implemented methods and apparatus for processing a graphical element that has an associated original type, including blending at least part of the graphical element and at least part of one or more other graphical elements to produce a transformed graphical element. The transformed graphical element has an associated transformed type, and the transformed type is different than the original type. Information about the original type is stored, and the transformed graphical element, an adjacent graphical element, or both are processed using the stored information about the original type.

24 Claims, 9 Drawing Sheets

U.S. PATENT DOCUMENTS

| | | | |
|---|---|---|---|
| 6,697,078 | B2 | 2/2004 | Becker et al. |
| 6,781,591 | B2 | 8/2004 | Raskar |
| 6,781,720 | B1 * | 8/2004 | Klassen ............... 358/3.27 |
| 6,850,338 | B1 | 2/2005 | Aschenbrenner et al. |
| 6,894,704 | B1 | 5/2005 | Bourdev et al. |
| 6,903,741 | B2 | 6/2005 | Corbetta |
| 6,987,585 | B1 | 1/2006 | Becker |
| 7,075,551 | B2 | 7/2006 | Becker et al. |
| 7,123,381 | B2 * | 10/2006 | Klassen ............... 358/1.9 |
| 7,139,098 | B2 * | 11/2006 | Klassen ............... 358/1.9 |
| 7,239,314 | B2 | 7/2007 | Johnston |
| 2003/0090689 | A1 | 5/2003 | Klassen |
| 2003/0179394 | A1 | 9/2003 | Lane et al. |
| 2003/0214534 | A1 | 11/2003 | Uemura et al. |
| 2004/0141194 | A1 | 7/2004 | Gupta et al. |
| 2004/0212628 | A1 | 10/2004 | Becker et al. |
| 2008/0088643 | A1 | 4/2008 | Yhann et al. |

OTHER PUBLICATIONS

PDF Reference fifth edition, Adobe Portable Document Format Version 1.6, 1984-2004 Adobe Systems Incorporated, [online], [retrieved Aug. 8, 2006] Retrieved from the Internet: http://partners.adobe.com/public/developer/en/pdf/PDFReference16.pdf.

"Adobe Design Center—Tutorials on how to use Adobe and Macromedia products together," © 2006 Adobe Systems Incorporated, [retrieved Oct. 10, 2006] Retrieved from the Internet: http://www.adobe.com/designcenter/tutorials/trapping/.

International Search Report for PCT Application No. PCT/US2007/080839 mailed Jun. 10, 2008, 18 pages.

Non-Final Office Action dated Jan. 2, 2009, for U.S. Appl. No. 11/546,507, 13 pages.

International Preliminary Report on Patentability for PCT Application No. PCT/US2007/080839 mailed Apr. 15, 2009, 7 pages.

* cited by examiner

PROCESSING ILLUSTRATIONS USING STORED INFORMATION

CROSS-REFERENCE TO RELATED APPLICATIONS

This application is a continuation application of and claims priority to U.S. application Ser. No. 10/786,771, filed on Feb. 25, 2004. The disclosure of the above application is incorporated by reference in its entirety.

BACKGROUND

The present invention relates to the processing of graphical elements in a computer-graphics illustration.

Computer-graphics illustrations are typically made up of a set of graphical elements of various types. Types of graphical elements include rasterized images, glyphs, vector strokes, vector fills, image masks, soft masks, and gradients. A graphical element typically includes a path, which defines the boundary of the graphical element. Graphical elements are typically handled as individual entities, and may interact with each other (e.g., by overlapping). Hereafter, any illustration discussed is a computer-graphics illustration unless otherwise noted.

When an illustration is printed, a printing device may print color in the illustration using multiple print units (e.g., individual printing plates in a multi-plate printing press). If the print units are not properly aligned, gaps can be formed between portions of the illustration having different colors. Gaps can also be formed if the medium on which the illustration is being printed shrinks or expands when ink is applied. To reduce the likelihood of gaps in a printed representation of an illustration, a process called trapping is used. Trapping involves creating traps—overlaps (spreads) or underlaps (chokes) of colors—prior to printing. A trapping process typically overlaps the colors of adjacent graphical elements selectively so that if the color of one graphical element is misaligned relative to the color of another graphical element during printing, the overlap will prevent the formation of an area between the graphical elements where no color is printed (a gap).

The rules used to trap an illustration depend on many factors, including the colors and types of the graphical elements being trapped. For example, when two images are trapped, centerline trapping (where a trap is centered on a border between two graphical elements) typically is used. When two vector graphical elements (e.g., vector fills) are trapped, the trap typically is located on one side of the border between the vector graphical elements. When a vector graphical element is trapped against an image, the trap location can be based on the color of the vector graphical element and the color of the image, or a user can specify the trap location so that the trap location does not change as the color of the image pixels changes. Traps between gradient graphical elements and other graphical elements can gradually move from one side of the boundary between graphical elements to the other as the color of the gradient changes. Lighter colors typically are spread or choked into darker colors. Trapping an illustration can be a time-consuming process. A computer program can be used to trap an illustration automatically. Automatic trapping typically involves a computer program trapping graphical elements in a computer-graphics illustration according to trapping rules that depend on the types of graphical elements involved.

SUMMARY

In one aspect, the invention features computer-implemented methods and apparatus, including computer program products, implementing techniques for processing an original graphical element that has an associated original type. At least part of the original graphical element and at least part of one or more other graphical elements are blended to produce a transformed graphical element. The transformed graphical element has an associated transformed type, where the transformed type is different than the original type. Information about the original type is stored, and the transformed graphical element, an adjacent graphical element, or both are processed using the stored information about the original type.

Particular implementations can include one or more of the following features. Information about a type associated with the other graphical element(s) can be stored, as can information about a colorspace and a color of the original graphical element. A shape of at least part of the original graphical element can be stored. The shape can be stored as a path or as a text glyph of the original graphical element. One or more edges in the transformed graphical element can be located using the stored shape. The transformed graphical element can be a rasterized representation of the blended parts of the original graphical element and the other graphical element(s).

Information about the original type can be stored in an invisible graphical element or in an XML element. Processing can include trapping the transformed graphical element, the adjacent graphical element, or both. Trapping can include using a path of the transformed graphical element to represent a path of at least part of the original graphical element. Trapping can also include using a color of the transformed graphical element to calculate a color of a trap element. Trapping can include using trapping rules that depend on the information about the original type.

Processing can include halftoning the transformed graphical element, the adjacent graphical element, or both. Blending can include flattening at least part of the original graphical element and at least part of the other graphical element(s) to produce the transformed graphical element. The original graphical element and/or at least one of the other graphical elements can be a transparent graphical element, and the transformed graphical element can be an opaque graphical element.

If the original graphical element was produced by blending two or more previous graphical elements, information about the type associated with at least one of the previous graphical elements can be stored. The original type can be raster, vector stroke, vector fill, image mask, soft mask, glyph, or gradient, and the transformed type can be raster.

The invention can be implemented to realize one or more of the following advantages. The appearance of trapped illustrations can be improved. File sizes of trapped illustrations can be decreased, and illustrations can be trapped with less user intervention. Graphical element edges can be detected with more accuracy. Raster data produced as a result of a transformation can be differentiated from raster data input by a user. If non-raster data is transformed into raster data, information associated with the non-raster data can be preserved and can be recovered from the raster data.

These general and specific aspects may be implemented using a system, a method, a computer program, or any combination of systems, methods, and computer programs.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
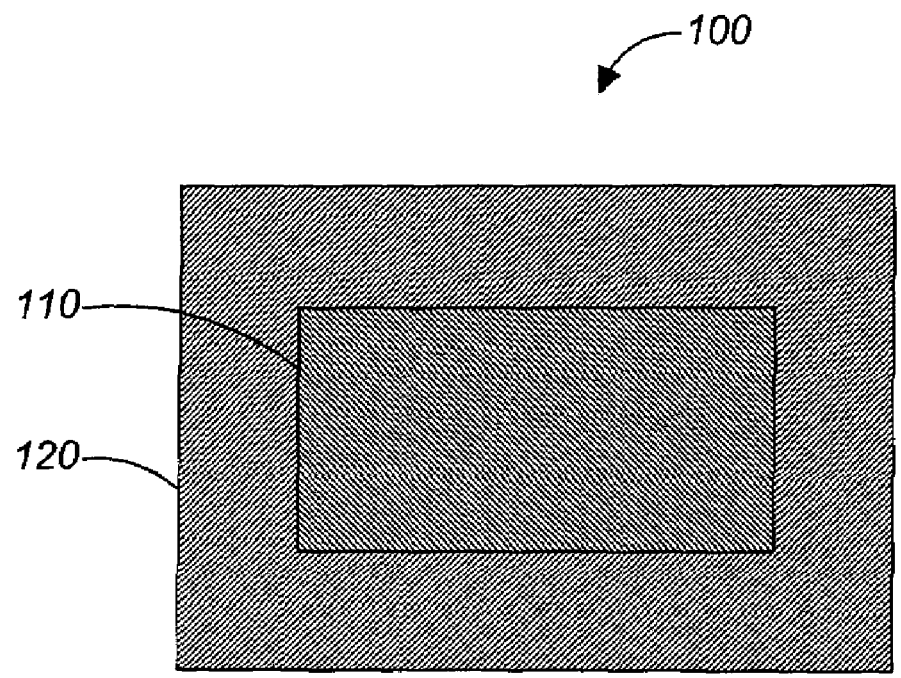
FIG. 1A shows a representation of a computer-graphics illustration.

FIG. 1A shows an illustration 100. A first rectangle 110 filled with a first color lies within a second rectangle 120 filled with a second color between the border of the first rectangle 110 and the border of the second rectangle 120. The first rectangle 110 is not filled with the second color.

Figure 1B:
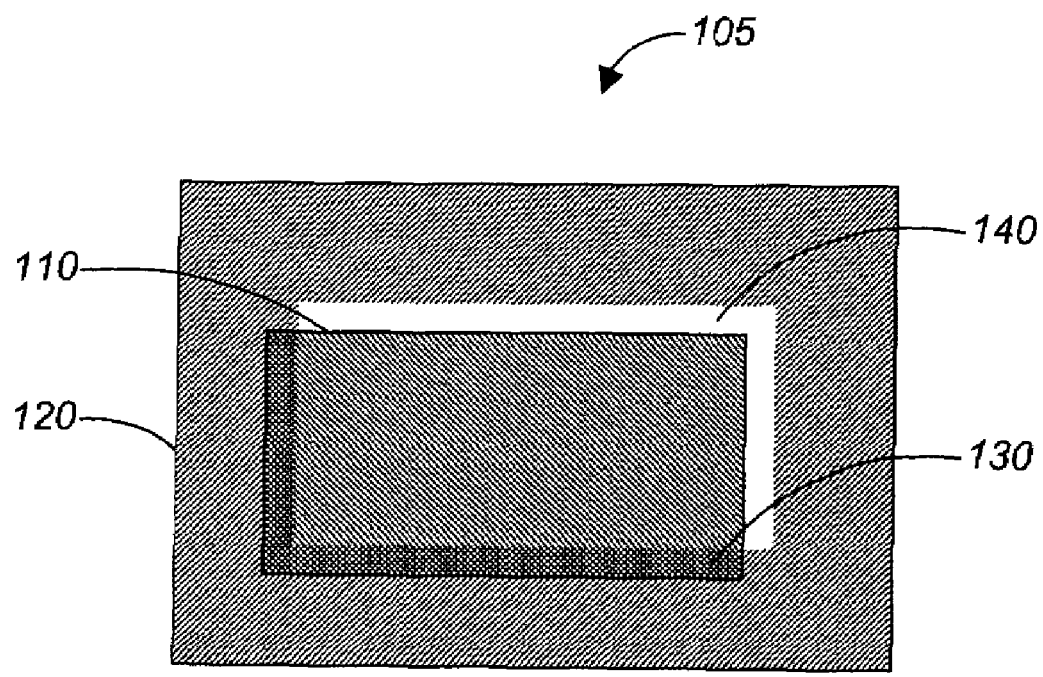
FIG. 1B is a depiction of the computer-graphics illustration of FIG. 1A printed with misaligned print units.

Referring to FIG. 1A and FIG. 1B, FIG. 1B shows the rectangles 110 and 120 of the illustration 100 printed with misaligned print units to produce a printed representation 105. In an illustrative example, the printed representation 105 is produced from the illustration 100 using a four-color (cyan, magenta, yellow, black) offset-lithography printing press. In this example, the first rectangle 110 is filled with yellow, and the area in the illustration 100 between the border of the first rectangle 110 and the border of the second rectangle 120 is filled with magenta. Although specific colors are used in this example, other colors can be used. A yellow plate of the printing press prints the area inside the first rectangle 110, and a magenta plate of the printing press prints the area between the borders of the rectangles 110 and 120 in the illustration 100. The yellow plate of the printing press is misaligned relative to the magenta plate of the printing press. The misalignment of the yellow and magenta printing plates causes the first rectangle 110 to be shifted relative to the second rectangle 120 and causes an area of overlap 130 and a gap 140. Both yellow and magenta are printed in the area of overlap 130, and no color is printed in the gap 140. Gaps, when present in a printed representation of an illustration, can lower the quality of the printed representation. Gaps in a printed representation of an illustration can make the printed representation harder for a person to read or can be distracting when the person is looking at the printed representation. An illustration can be trapped by modifying the original graphical elements in the illustration or by adding trap elements—graphical elements whose sole purpose is trapping the illustration.

Figure 2A:
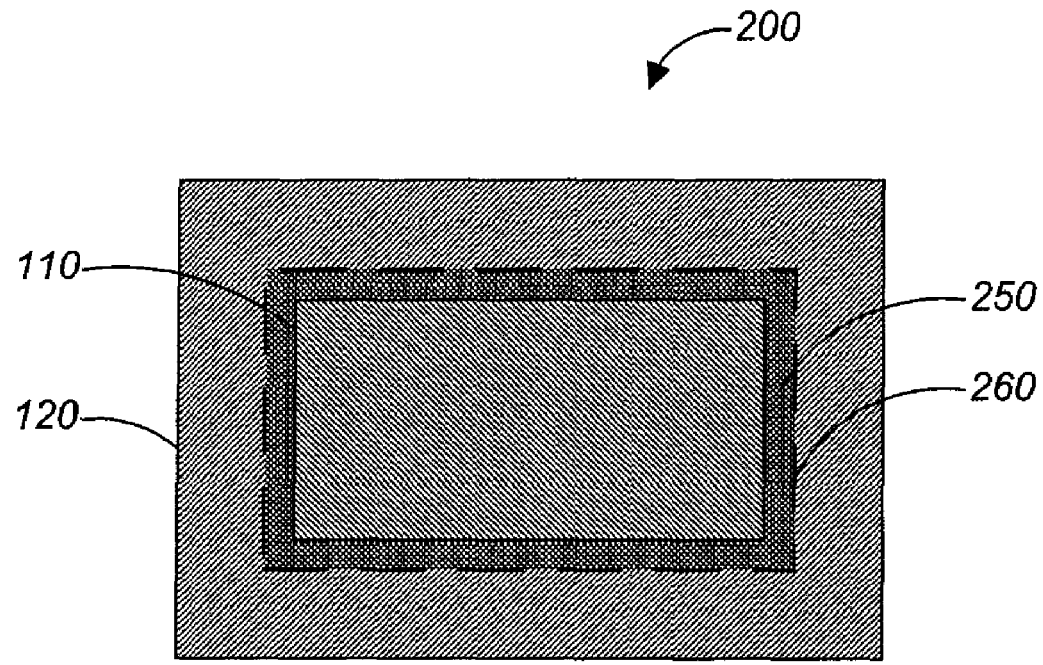
FIG. 2A shows a representation of a trapped computer-graphics illustration.

Referring to FIG. 1A and FIG. 2A, an illustration 200 corresponds to the illustration 100 but with a trap element 250 applied to the first rectangle 110 and the second rectangle 120. The trap element 250 creates a region where the area of coverage of the first color has been increased so that the first color and the second color overlap when the illustration 200 is printed with properly aligned print units. The trap element 250 acts as a buffer against gaps caused by misaligned print units or a change in dimension during printing of the medium on which the illustration 200 is being printed. The size of the added region where colors overlap (e.g., trap element 250) typically corresponds to a degree of misalignment of the print units that is expected or typical during printing. A dashed line 260 represents the outer boundary of the trap element 250, but the dashed line 260 is not typically a graphical element in the illustration 200. In this example, the trap element 250 extends the area covered by the first color. Alternatively, a trap element could be applied to the second color (in which case the trap element would extend the area of coverage of the second color into the inside of the first rectangle 110) or to both colors.

Figure 2B:
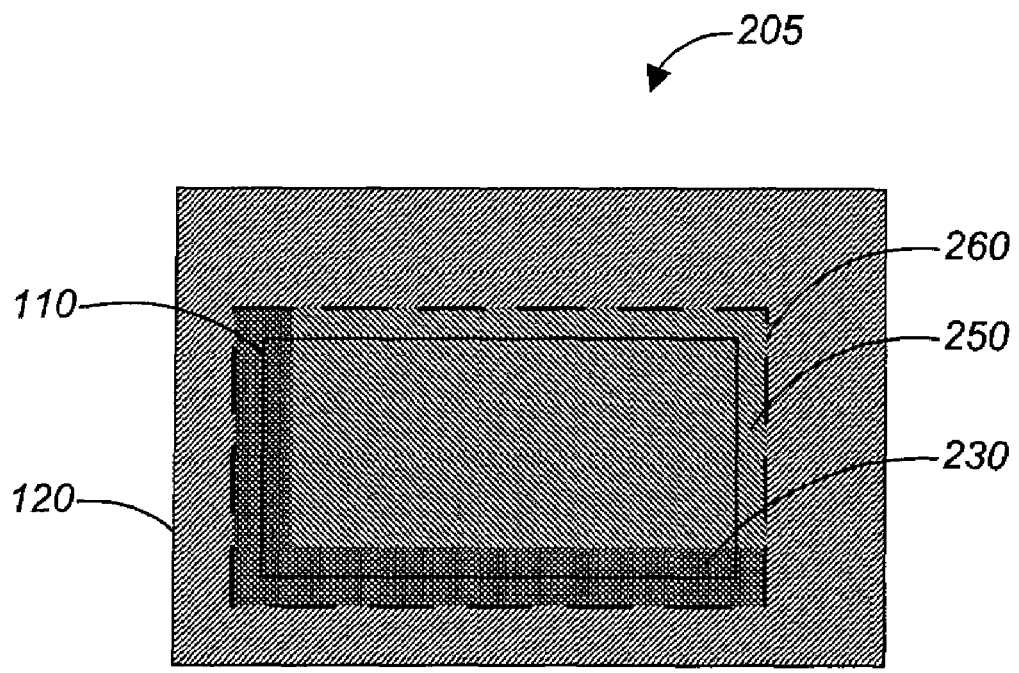
FIG. 2B is a depiction of the trapped computer-graphics illustration of FIG. 2A printed with misaligned print units.

Referring to FIG. 2A and FIG. 2B, FIG. 2B shows the illustration 200 printed with misaligned print units to produce a printed representation 205. Using the example from FIG. 1B, misalignment of a yellow printing plate and a magenta printing plates causes the first rectangle 110 to be shifted relative to the second rectangle 120. The trap element 250, which in this example is yellow (the color of the first rectangle 110), is also shifted relative to the second rectangle 120 because trap element 250 is printed with the same printing plate as the first rectangle 110. An area of overlap 230 is larger than the corresponding area of overlap 130 in FIG. 1B, but there is no gap between the areas of yellow and magenta. The area of overlap 230 may be visible in the printed representation 205, but the area of overlap 230 is typically less noticeable and/or distracting than the gap 140 of FIG. 1B.

When an illustration is prepared for printing, the illustration can be processed to transform graphical elements having properties that are not compatible with a printing device into new or changed graphical elements that are compatible with the printing device. For example, transparent graphical elements are typically transformed into opaque graphical elements before printing because printing devices typically use substantially opaque inks to print illustrations. An example of a transparent graphical element is a graphical element representing a piece of colored glass. The transparent graphical element's transparency allows graphical elements behind the colored glass to affect the colors visible through the colored glass. Thus, the appearance of the transparent graphical element typically changes as the transparent graphical element is moved within an illustration based on the color and characteristics of the graphical elements behind the transparent graphical element. Once the transparent graphical element is transformed into an opaque representation, the opaque representation will obscure a region of the illustration to which the opaque representation is moved. Transparent graphical elements can be transformed by a computer program or by software/firmware in a printer to create one or more opaque regions that replicate the appearance of the transparent graphical element and any graphical elements that are overlapped by the transparent graphical element. Each opaque region can be created by blending the appearances of the graphical elements in the region. For example, the color of a transparent graphical element that overlaps an opaque graphical element can be blended with the color of the opaque graphical element to create a new opaque graphical element that has the same appearance as the original graphical elements. One way of dealing with transparency when preparing an illustration for printing is to flatten the transparent graphical elements and the elements that they overlap. Flattening is a type of transformation in which graphical elements are merged together into new or modified graphical elements when the interaction between the original elements cannot accurately be represented by a target (e.g., a printing device).

Flattening typically involves dividing a group of graphical elements being flattened into flattening regions. A flattened appearance can be determined for each flattening region, such that a single opaque graphical element with the flattened appearance would approximate the appearance of the original collection of graphical elements in the flattening region closely. One kind of flattening region is an atomic region. Atomic regions are the individual non-null areas defined by the intersection of either the inside or the outside area of every graphical element included in the flattening. A given atomic region includes a portion of one or more graphical elements that form a set of graphical elements that is not identically the same as the set of graphical elements in any other atomic region. The flattened representation of an atomic region can be a raster graphical element (e.g., a rasterized image) or the flattened representation can be a vector graphical element (e.g., a vector fill). Another kind of flattening region is a complexity region, which is the union of multiple atomic regions. A complexity region can be used instead of individual atomic regions when individually processing the atomic regions contained in the complexity region would consume too many resources (e.g., time or memory). A complexity region is represented by a raster graphical element.

Conventional automatic trapping of a transformed illustration (e.g., a flattened illustration) typically is performed on transformed graphical elements without regard to the types of the original graphical elements that were transformed to produce the transformed graphical elements. For example, a raster graphical element that was the result of flattening two vector graphical elements typically is processed as a raster graphical element instead of as a vector graphical element.

Figure 3A:
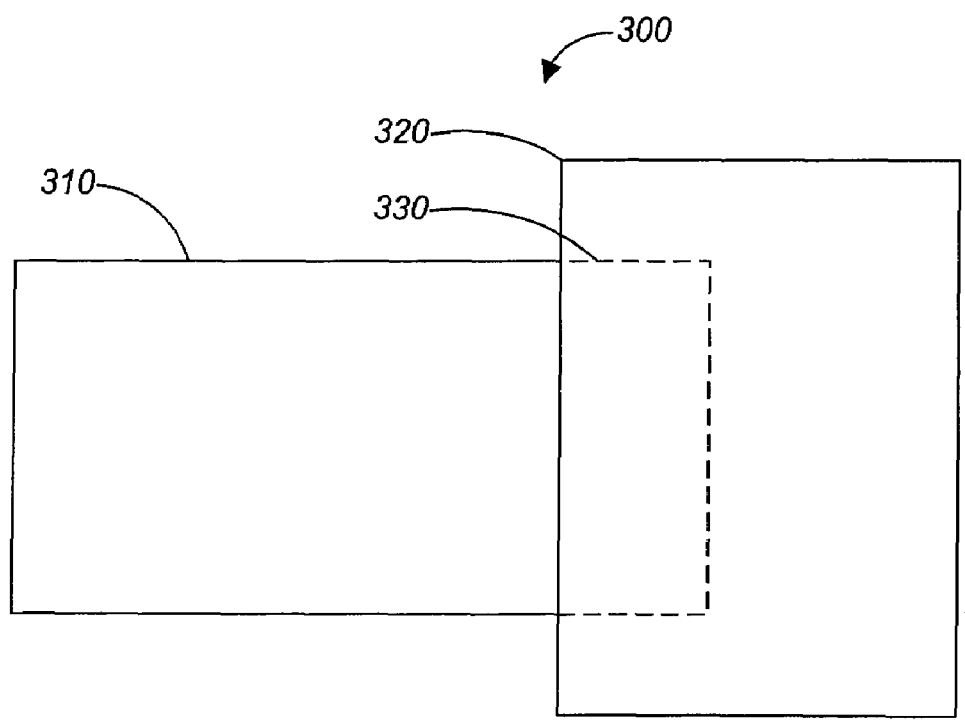
FIG. 3A shows a representation of a computer-graphics illustration.

FIG. 3A depicts a situation in which conventional automatic trapping of an illustration can give poor results. An illustration 300 includes a first graphical element 310 and a second graphical element 320. The second graphical element 320 overlaps the first graphical element 310, and a dashed line 330 indicates the portion of the first graphical element 310 lying under the second graphical element 320. The first graphical element 310 is an opaque image (e.g., a scanned and rasterized representation of a photograph), and the second graphical element 320 is a transparent graphical element.

Figure 3B:
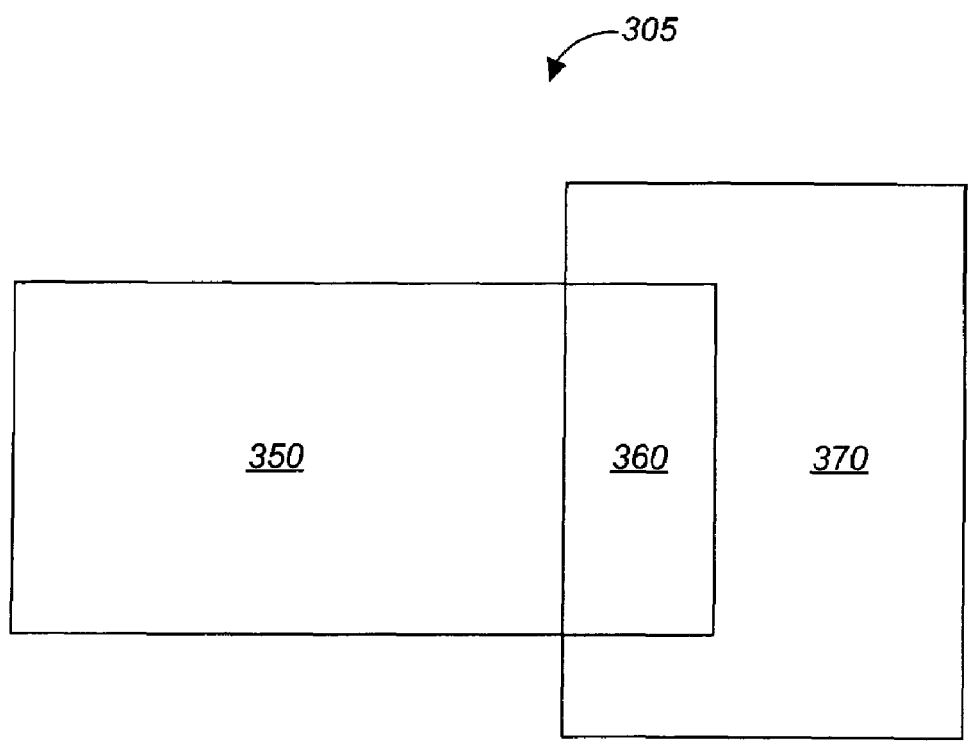
FIG. 3B is a depiction of the computer-graphics illustration of FIG. 3A divided into flattening regions.

Referring to FIG. 3A and FIG. 3B, the illustration 300 is divided into a first flattening region 350, a second flattening region 360, and a third flattening region 370 to produce an illustration 305. The illustration 300 is transformed into the illustration 305 to remove transparency (e.g., the transparency of the second graphical element 320) from the illustration 300. Each of the flattening regions 350, 360, and 370 is processed to produce an opaque graphical element that represents the respective flattening region. The only part of a graphical element included in the first flattening region 350 is a part of the first graphical element 310, which is opaque, so an opaque graphical element is produced that is identical to the part of the first graphical element 310 in the first flattening region 350.

The second flattening region 360 contains a part of the second transparent graphical element 320 that overlaps a part of the first graphical element 310. The appearances of the parts of the graphical elements 310 and 320 that correspond to the second flattening region 360 are blended together to produce an opaque representation of the second flattening region 360 that has the same appearance as the corresponding region in the illustration 300. Because the first graphical element 310 is a rasterized image, the opaque graphical element representing the second flattening region 360 is a rasterized image. In the third flattening region 370, part of the transparent second graphical element 320 is blended with a background of the illustration 300 to produce an opaque graphical element representing the third flattening region 370 that has the same appearance as the corresponding region in the illustration 300.

Figure 3C:
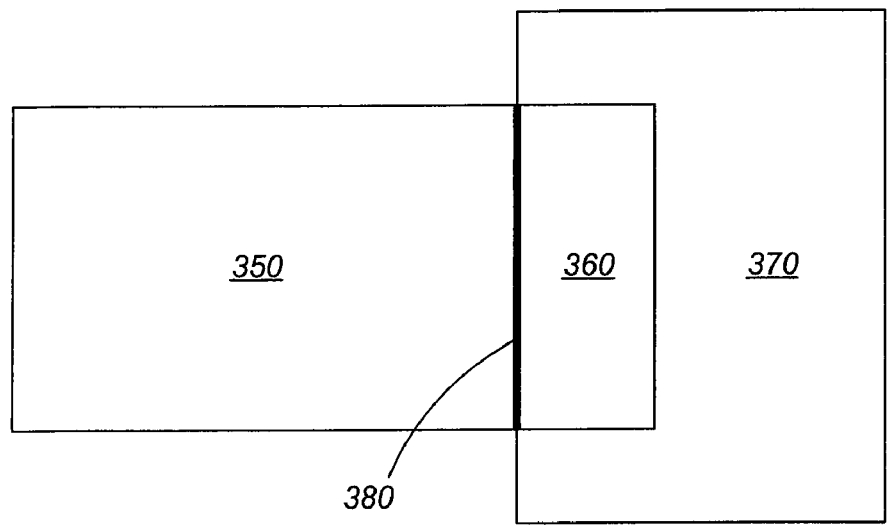
FIG. 3C is a depiction of trapping between the flattening regions of FIG. 3B.

Referring to FIG. 3B and FIG. 3C, a border between the flattening regions 350 and 360, represented by a heavy line 380, is trapped to prepare the illustration 305 for printing. Each of the flattening regions 350 and 360 is represented in the illustration 305 by a respective graphical element that is an opaque rasterized image. Trapping between rasterized images typically produces many trap elements that can be as small as a single pixel. A new trap element typically is used along the line 380 whenever a pixel color of the rasterized images representing the flattening regions 350 or 360 varies from the color of an adjacent pixel along the line 380 and in the same flattening region. When many trap elements are produced along the line 380, the computing resources required to store and process the trapped illustration 305 can increase significantly compared to the computing resources required to store and process the illustration 300. The addition of trap elements to the illustration 305 can also degrade the quality of the illustration 305. Additional trap elements (not shown) typically are placed automatically between the second flattening region 360 and the third flattening region 370 when conventional automatic trapping is used.

Figure 4A:
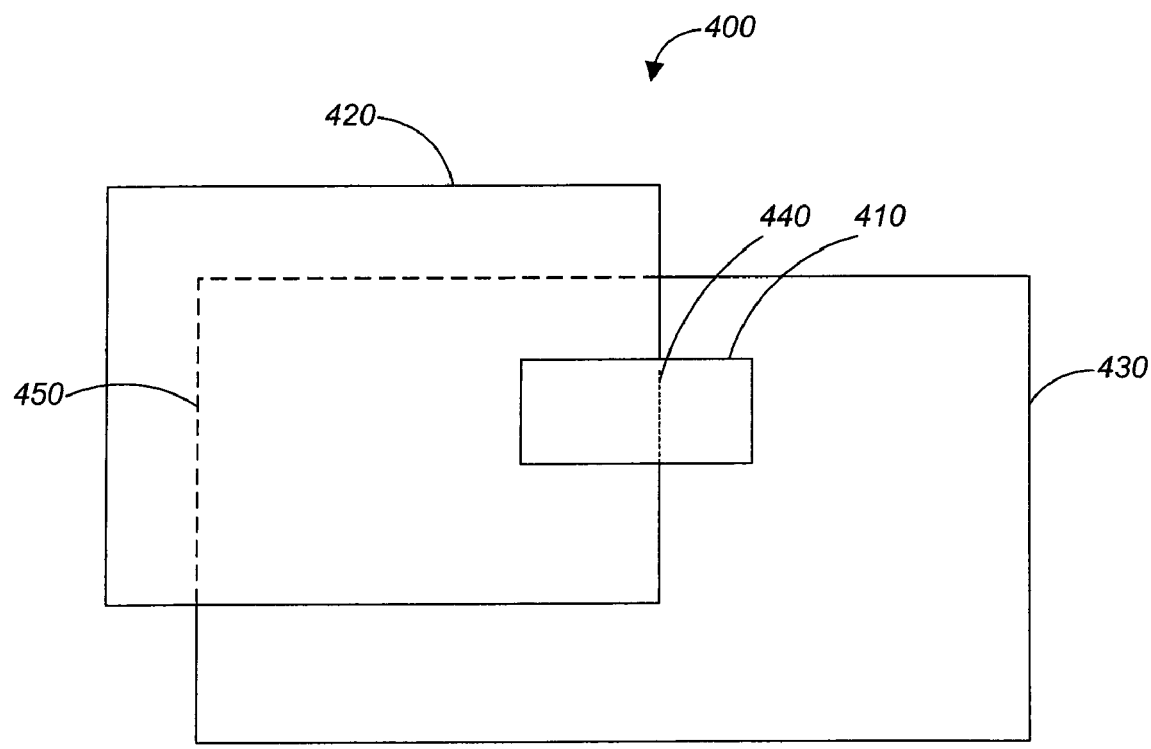
FIG. 4A shows a representation of a computer-graphics illustration.

FIG. 4A depicts another situation in which conventional automatic trapping of an illustration can give poor results. An illustration 400 includes a top graphical element 410, a middle graphical element 420, and a bottom graphical element 430. The top graphical element 410 is a transparent solid-colored vector graphical element and is the top-most graphical element (e.g., the last graphical element in a paint order) in the illustration 400. The middle graphical element 420 is an opaque vector graphical element and is the next-highest graphical element (e.g., the penultimate graphical element in the paint order) in the illustration 400. The bottom graphical element 430 is a gradient mesh—a vector graphical element having multiple color gradients. The bottom graphical element 430 is opaque. A dashed line 440 indicates a portion of the border of the middle graphical element 420 lying below the top graphical element 410. Because the top graphical element 410 is transparent, the portions of the graphical elements 420 and 430 lying below the top graphical element 410 are visible, although the appearance of the portions of the graphical elements 420 and 430 lying below the top graphical element 410 may be altered by the presence of the top graphical element 410. A dashed line 450 indicates the portion of the border of the bottom graphical element 430 lying below the middle graphical element 420. Since the middle graphical element 420 is opaque, the portion of the bottom graphical element 430 lying below the middle graphical element 420 is not visible.

Figure 4B:
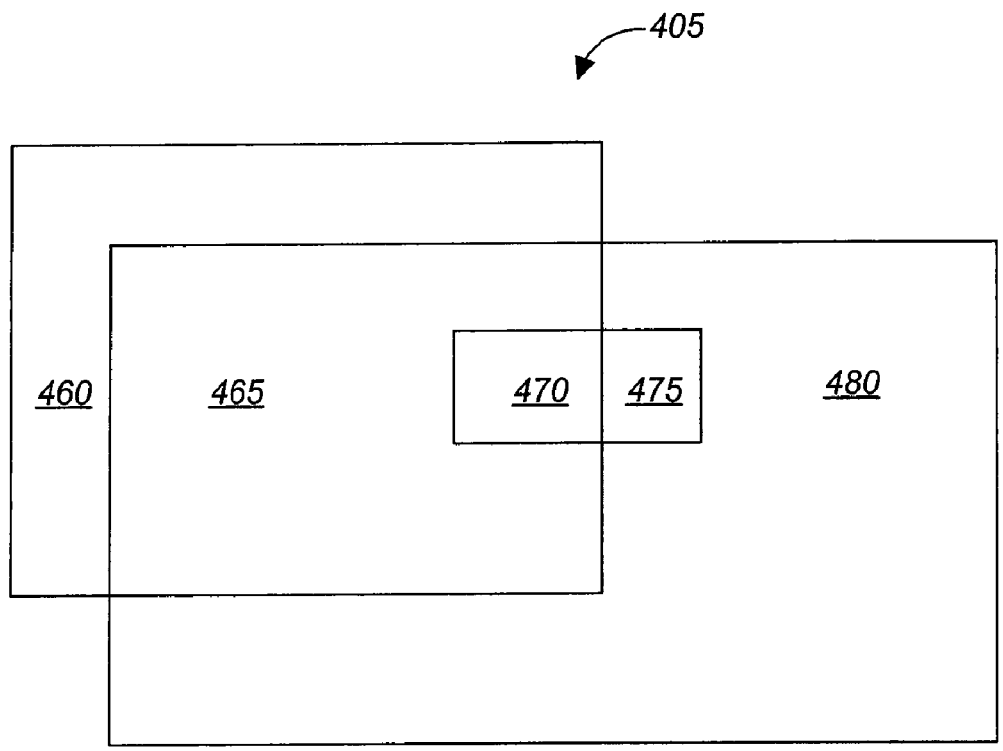
FIG. 4B is a depiction of the computer-graphics illustration of FIG. 4A divided into flattening regions.

Referring to FIG. 4A and FIG. 4B, the illustration 400 is divided into flattening regions 460, 465, 470, 475, and 480 to produce an illustration 405. The illustration 400 is transformed into the illustration 405 to remove transparency (e.g., the transparency of the top graphical element 410) from the illustration 400. Each of the flattening regions 460, 465, 470, 475, and 480 is processed to produce an opaque graphical element that represents the respective flattening region (e.g., by blending colors in transparent graphical elements with colors in underlying graphical elements). The first flattening region 460 corresponds to a part of the opaque vector middle graphical element 420 that does not interact with the graphical elements 410 or 430. The flattened representation of the first flattening region 460 is an opaque vector graphical element. The second flattening region 465 corresponds to the overlapping regions of the graphical elements 420 and 430 that do not interact with the top graphical element 410. Because the middle graphical element 420 overlaps the bottom graphical element 430 and the middle graphical element 420 is an opaque vector graphical element, the flattened representation of the second flattening region 465 will be an opaque vector graphical element. In one implementation of flattening, the first flattening region 460 and the second flattening region 465 are combined into a single flattening region, since flattening regions 460 and 465 share a common topmost opaque graphical element.

In the third flattening region 470, the graphical elements 410, 420, and 430 all overlap. The bottom graphical element 430 is not visible in the third flattening region 470 because the middle graphical element 420 is opaque. The appearances of the parts of the graphical elements 410 and 420 in the third flattening region 470 will be blended together to produce a flattened representation of the third flattening region 470. Because the top graphical element 410 is a transparent constant-colored vector graphical element and the middle graphical element 420 is an opaque vector graphical element, the flattened representation of the third flattening region 470 will be an opaque vector graphical element. Part of the top graphical element 410 overlaps part of the bottom graphical element 430 in the fourth flattening region 475. Because the bottom graphical element 430 is a gradient mesh, which is a complicated element, the flattened representation of the fourth flattening region 475 will typically be an opaque raster graphical element. Hereafter, the flattened representation of the fourth flattening region 475 is assumed to be an opaque raster graphical element. The fifth flattening region 480 includes only the bottom graphical element 430, so the flattened representation of the fifth flattening region 480 is an opaque vector graphical element.

Figure 4C:
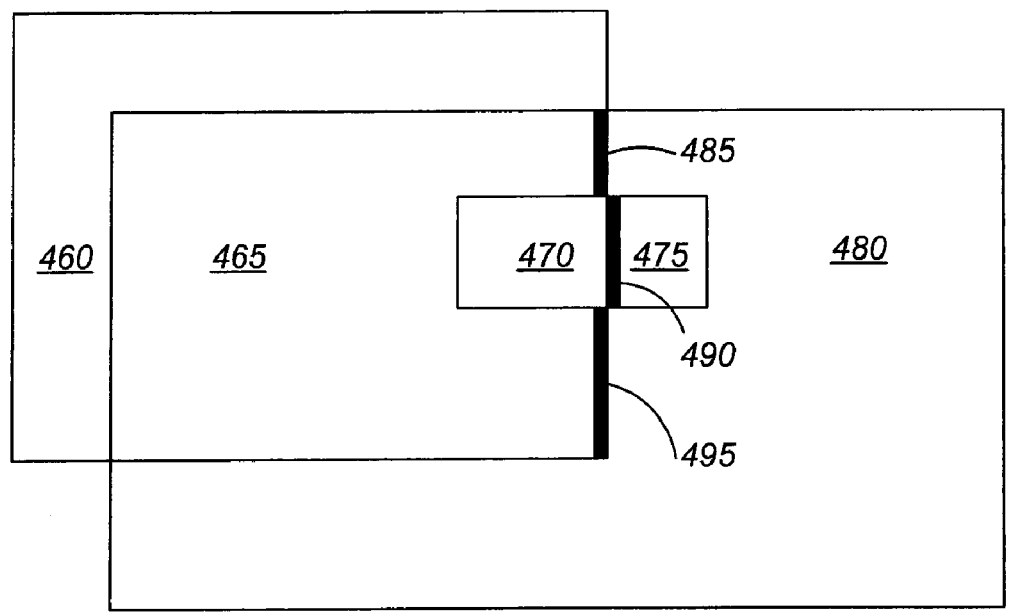
FIG. 4C is a depiction of trapping between the flattening regions of FIG. 4B.

In FIG. 4C, a border between the flattening regions 465 and 480 is trapped, and one or more trap elements between the flattening regions 465 and 480 are represented by a heavy line 485 and a heavy line 495. A border between the flattening regions 470 and 475 is also trapped, and the one or more trap elements between the flattening regions 470 and 475 are represented by a heavy line 490. Because the representations of the flattening regions 465 and 480 are both vector graphical elements, a set of trapping rules for trapping between two vector elements will be applied. Because the representation of the third flattening region 470 is a vector graphical element and the representation of the fourth flattening region 475 is a raster graphical element, a set of rules for trapping between a vector element and a raster element will be applied. The set of rules for trapping between two vector elements typically differs from the set of rules for trapping between a vector element and a raster element, so the trap location can change between the trap elements represented by the lines 485 and 495 and the trap elements represented by the line 490. An abrupt change in trap location along a border between graphical elements can be visible and can lower the quality of the trapped illustration.

The borders of flattening regions in an illustration, especially in a complex illustration, can be difficult for a user of a computer-graphics program to determine. For this and other reasons, the results of automatically trapping an illustration can be difficult for the user to predict, and the results of trapping can confuse and frustrate the user. For example, a soft-mask graphical element (a transparency mask that allows multiple levels of transparency to be selected) can affect the appearance of a region in an original illustration, but can extend outside of the region and can cause changes in trap location outside the region when the illustration is trapped. A user may expect the soft-mask graphical element to influence how the illustration is trapped only in the region where the soft-mask graphical element affects the appearance of the illustration, and the user may therefore be confused by the results of the trapping.

Figure 5A:
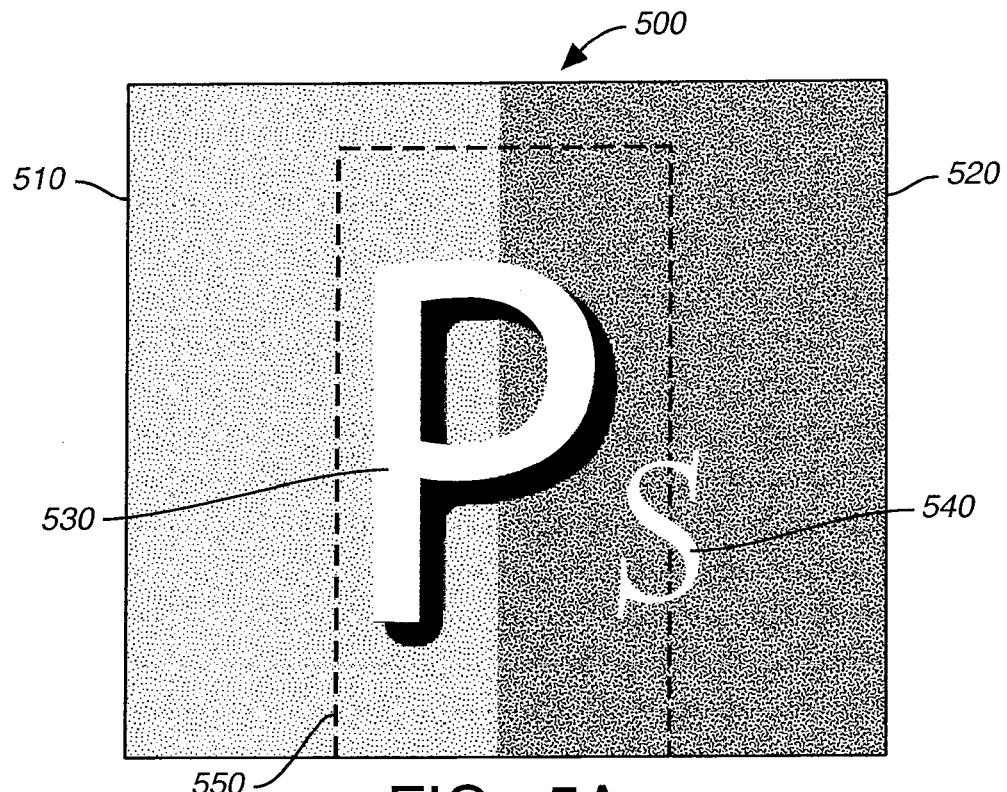
FIG. 5A shows a representation of a computer-graphics illustration including a drop shadow.

Referring to FIG. 5A, an illustration 500 includes a first rectangular graphical element 510 that is filled with a first color. A second rectangular graphical element 520 is filled with a second color. A first opaque graphical element 530 filled with a third color lies above the graphical elements 510 and 520. A second opaque graphical element 540, also filled with the third color, lies above the second rectangular graphical element 520. The second color is darker than the first color, and the first color is darker than the third color. A dashed line indicates the boundary of a drop shadow graphical effect 550. A drop shadow graphical effect is a combination of a soft-mask graphical element and a third opaque graphical element. The third opaque graphical element can be, for example, an image or a vector fill graphical element. The soft-mask graphical effect and the third opaque graphical element cover the entire area of graphical effect 550. The soft-mask in the drop shadow graphical effect 550 controls the visibility of the third opaque graphical element by influencing the transparency of the third opaque graphical element. Though both the soft-mask graphical element and the third opaque graphical element cover the entire region of graphical effect 550, the soft mask controls the visibility of the third opaque graphical element so that graphical effect 550 is only visible where graphical effect 550 creates a shadow of the first opaque graphical element 530. A drop shadow graphical effect (e.g., graphical effect 550) is used to make it appear that a first graphical element (e.g., graphical element 530) is suspended above other graphical elements (e.g., rectangular graphical elements 510 and 520), adding a degree of three-dimensionality to a two-dimensional image.

Figure 5B:
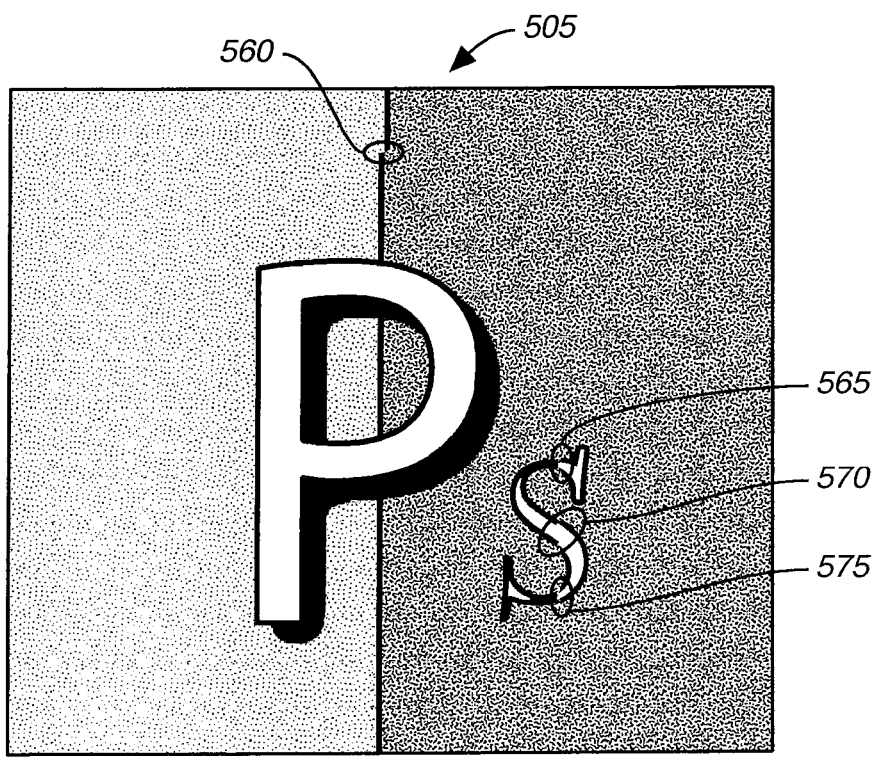
FIG. 5B shows a representation of the computer-graphics illustration of FIG. 5A automatically trapped using conventional methods.

FIG. 5B shows a trapped illustration 505 that corresponds to illustration 500, but is trapped using a conventional trapping process. Circles 560, 565, 570, and 575 surround discontinuities where the trap elements used to trap the illustration 505 change location. The graphical effect 550 (from FIG. 5A), which includes a transparent soft-mask graphical element, has been blended with the graphical elements 510, 520, 530, and 540 in a flattening that preceded the production of the trapped illustration 505. The flattened graphical elements produced to represent the region that was covered by the graphical effect 550 in the illustration 500 (FIG. 5A) are rasterized image graphical elements, which are of a different type than the surrounding vector graphical elements, so the rules used to trap a flattened representation of the illustration 500 change at the border of the region that was covered by the graphical effect 550, creating discontinuities in the trapped illustration 505.

Figure 6:
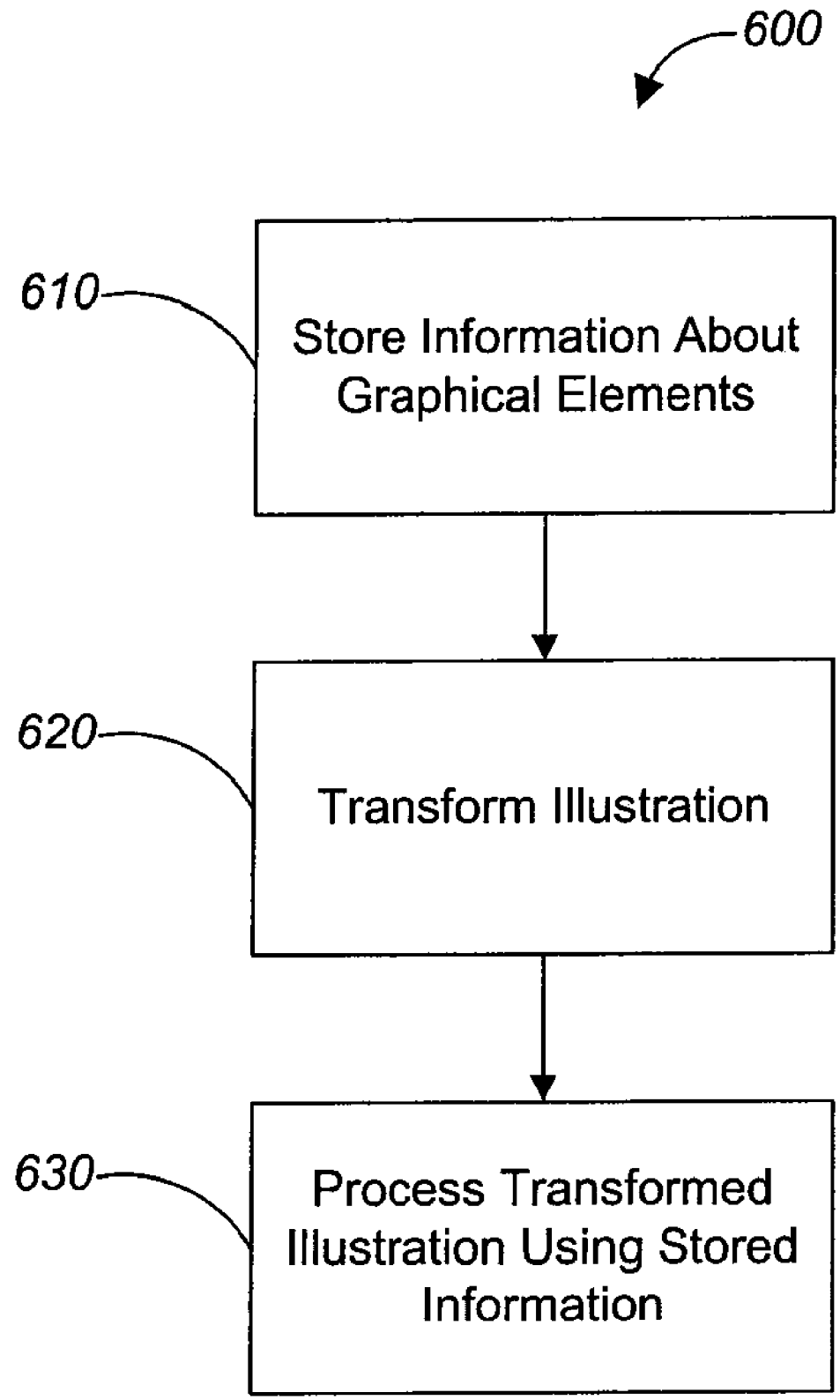
FIG. 6 is a flowchart of a process for transforming and trapping a computer-graphics illustration.
Figure 7:
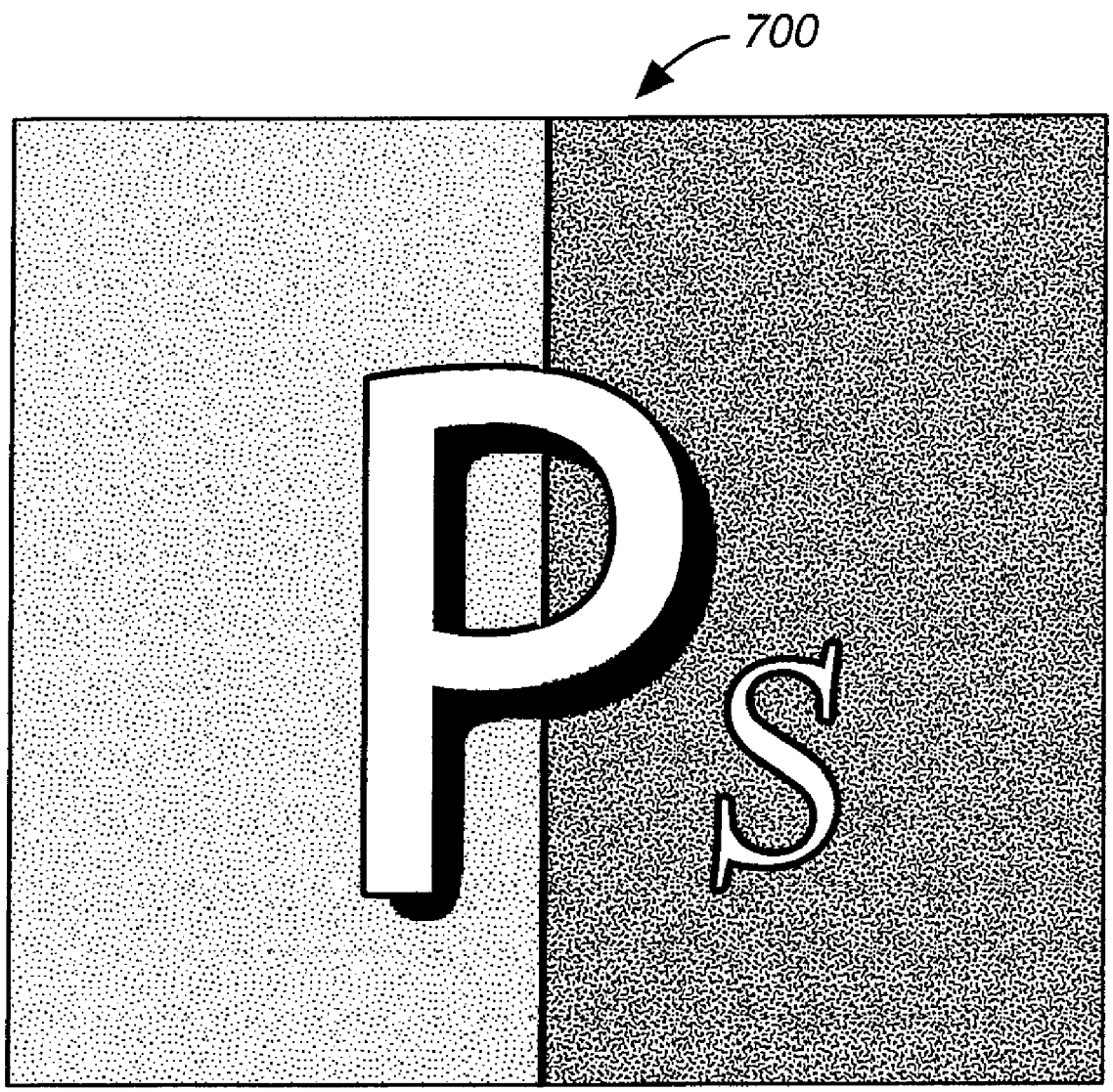
FIG. 7 shows a representation of the computer-graphics illustration of FIG. 5A transformed and trapped using the process of FIG. 6.

FIG. 6 shows a process 600 that can be used to transform and process an illustration or a part of an illustration, where the part can be as small as a portion of a single graphical element. The process 600 improves the quality of a processed illustration compared to conventional automatic processing techniques and can reduce the amount of user intervention required to obtain high-quality results. Information about one or more graphical elements in an illustration is stored (step 610) before part or all of the illustration is transformed (step 620). After the illustration is transformed, the information stored in step 610 is used to guide the processing (e.g., trapping) of the transformed illustration (step 630). In some implementations, information about one or more graphical elements is stored during the transformation, so the steps 610 and 620 are combined. The process 600 can be used in many contexts. For example, the process 600 can be implemented in a graphics program (e.g., Adobe® InDesign®) or in a plug-in to a graphics program.

The information stored about a graphical element in step 610 can include one or more of the following: the shape of the graphical element, the type of the graphical element (e.g., raster, vector fill, vector stroke, glyph, image mask, soft mask, gradient, etc.), the transparency of the graphical element, the colorspace of the graphical element (e.g., CMYK, RGB, etc.), and the color of the graphical element. Information about the shape of a graphical element can be stored in multiple ways. For example, the path of a graphical element can be stored as the shape of the graphical element. A combination of the path of the graphical element and a clip path can also be stored as the shape of the graphical element. If a graphical element is composed of sub elements (e.g., when a graphical element is painted with a pattern color), the path or paths of the sub elements can be stored as information about the shape of the graphical element. Information about the shape of an image-mask can be stored by storing which pixels are "on" in the imagemask.

The information stored in step 610 can be stored as a non-marking (invisible) graphical element. In some implementations, the information stored in step 610 is stored as metadata using custom operators. In some implementations, the information stored in step 610 is stored using Extensible Markup Language (XML) elements. Complete information about the graphical elements involved in a transformation can be stored in step 610. In other words, invisible copies can be made of the graphical elements involved in the transformation before the illustration is transformed in step 620. The information stored in step 610 can depend on the transform that is used in step 620. For example, if the transform of step 620 is flattening, step 610 can store information about the graphical elements included in each flattening region. In some implementations, if the flattening region is an atomic region, only information about the types of graphical elements included in the atomic region is stored. Information about the paths of the parts of the graphical elements included in the atomic region does not have to be stored, because the paths of interest are the same as the path of the atomic region, and step 630 can use the atomic region's path to represent the path of the parts of the graphical elements included in the atomic region. In some implementations, if the flattening region includes an image-mask graphical element, information about the shape of the image-mask graphical element is stored. In some implementations, if the flattening region is a complexity region, information about the type and shape of the parts of the graphical elements included in the complexity region is stored. Storing shape information allows step 630 to find edges within the complexity region in the transformed illustration. In some implementations, if a flattening region includes a soft-mask graphical element (e.g., a soft mask used to produce a drop shadow), information about the types, colorspaces, and colors of the graphical elements in the region is stored.

The transformation in step 620 changes or discards information about one or more graphical elements that are transformed, so that the transformed illustration includes different information than the original illustration. The transformation in step 620 can be flattening. As was described above, flattening a flattening region that includes a vector graphical element and a raster graphical element can result in raster graphical element that represents the flattening region in the transformed illustration. A conventional raster graphical element representing a flattening region typically does not include information about the graphical elements that were transformed into the raster graphical element. Therefore, information about the graphical elements in the original illustration is lost during the transformation process if the information is not stored (e.g., in step 610). The transformation in step 620 can be rasterization. For example, an illustration including many types of graphical elements can be rasterized and represented by a rasterized illustration. The rasterized illustration typically does not include explicit information about the graphical elements in the original illustration, so information about the graphical elements in the original illustration is lost during the transformation process if the information is not stored (e.g., in step 610).

In step 630, the information from step 610 about the graphical elements in the original illustration is used to process the transformed illustration. For example, if a flattening region is represented by a raster graphical element in the transformed illustration, the information stored in step 610 is used to determine whether any graphical element in the original illustration corresponding to the flattening region was a type of graphical element other than raster. If it is determined, for example, that a graphical element in the original illustration corresponding to the flattening region was a vector graphical element, different rules may be used to process the flattening region in the transformed illustration than would have been used if all graphical elements in the original illustration corresponding to the flattening region were raster graphical elements. In another example, multiple intersecting graphical elements in the original illustration are rasterized to produce a raster graphical element in the transformed illustration. Information from step 610 about the shapes (e.g., paths) of the intersecting graphical elements in the original illustration can be used to find edges within the raster graphical element. Using the shapes of the graphical elements to find edges in the raster graphical element typically gives better results than using conventional edge-detection methods; false positives (which cause unnecessary traps to be formed) and false negatives (which cause missing traps) can be reduced or avoided.

Processing the transformed illustration in step 630 can include trapping the transformed illustration. In some implementations, a transformed illustration is trapped using the information from step 610 combined with color information from the transformed illustration. For example, if multiple transparent graphical elements in an illustration are flattened to produce a single opaque graphical element, the color of the opaque graphical element can be used to trap the flattened illustration along with information about the transparent graphical elements. Using the color of the opaque graphical element during trapping, instead of re-blending the transparent graphical elements, speeds trapping and ensures that the color of the trap element(s) used to trap the opaque graphical element will be based on the color of the opaque graphical element itself rather than on a re-blended version of the transparent graphical elements. In some implementations, the stored information from step 610 can be preserved after trapping to allow the trap elements to be removed from the trapped illustration and to allow the transformed illustration to be re-trapped.

Processing the transformed illustration in step 630 can include halftoning the transformed illustration. For example, raster graphical elements can be screened with a different halftone screen than vector graphical elements are screened with. If a single graphical element is transformed into multiple transformed graphical elements, some of which are vector graphical elements and some of which are raster graphical elements, the stored information from step 610 can be used to apply a uniform halftone screen to transformed graphical elements.

Step 630 can also involve image post-processing. Raster graphical elements can be post-processed (e.g., sharpened) by, for example, a processing unit in a printing device. Using the process 600 in this context would allow transformed graphical elements that are associated with a single original (pre-transformation) graphical element to be post-processed in a unified manner.

In some implementations, an original graphical element in an illustration can be transformed in step 620 during a first use of process 600, and the transformed graphical element can be processed again during a second use of process 600. In this case, the information about the transformed graphical element that is stored during the second use of process 600 can be the type of the original graphical element or can be other information associated with the original graphical element.

Referring again to FIG. 3A, FIG. 3B, FIG. 3C, and FIG. 6, if the process 600 were used to trap the illustration 305, trap elements would not typically be placed along the line 380. Because the trapping process 630 can determine that the flattening regions 350 and 360 both include part of the image 310 by using stored information from step 610, trap elements typically are not necessary along the line 380. Likewise, trap elements are not typically necessary between the flattening regions 360 and 370 when the process 600 is used to trap the illustration 305.

Referring to FIG. 5A, FIG. 5B, FIG. 6, and FIG. 7, a trapped illustration 700 is the illustration 500 trapped using the process 600. The discontinuities of the illustration 505 can be avoided in the illustration 700, because the flattened graphical elements produced to represent the region in the illustration 500 (FIG. 5A) that was covered by the graphical effect 550, while still of a different type than the surrounding graphical elements, can be trapped using information stored before the flattening. In particular, stored information about the graphical elements 510, 520, 530, 540 can be used to determine the rules used to trap the region covered by the graphical effect 550 in the illustration 500.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 8:
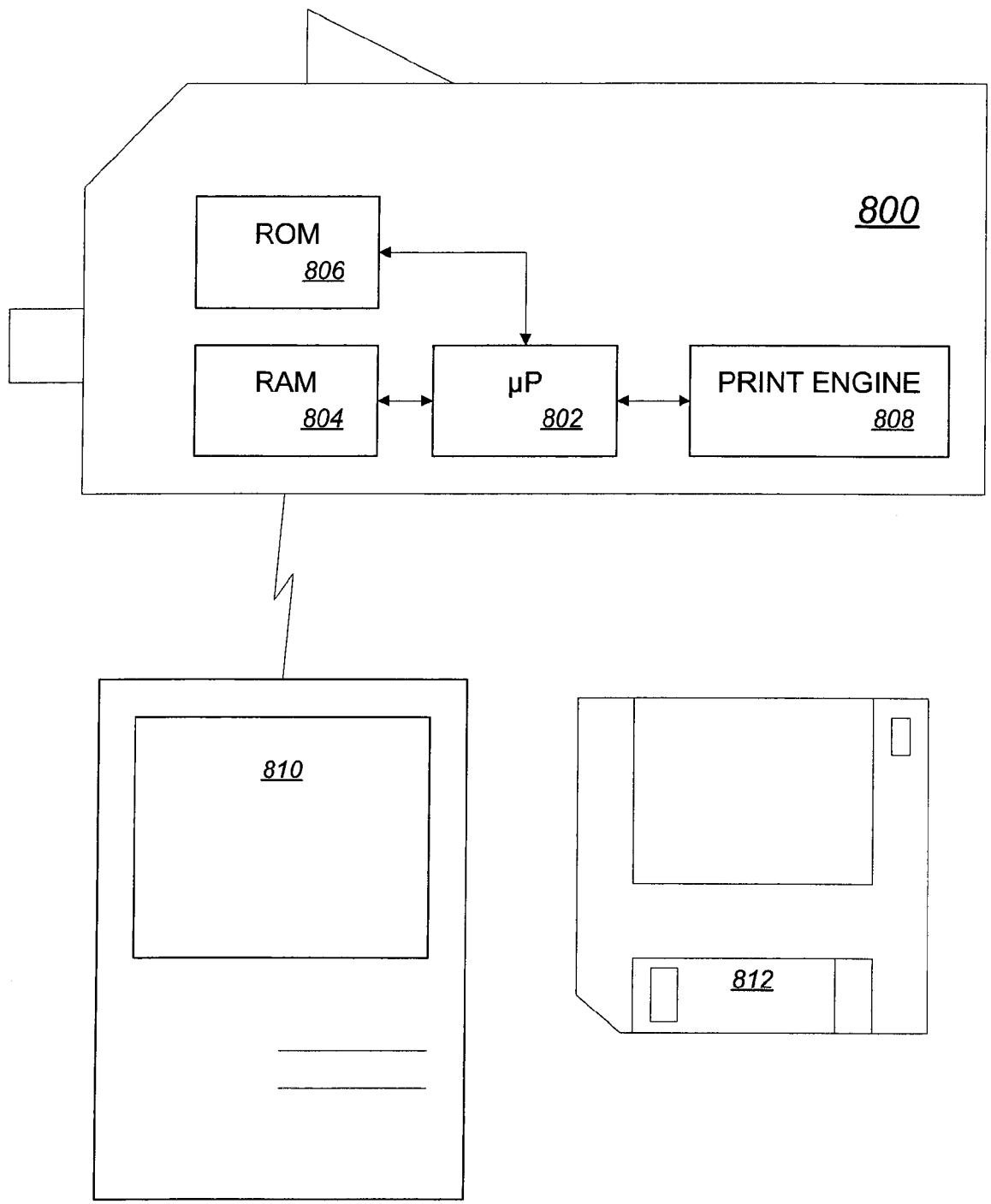
FIG. 8 shows a printing device and system.

By way of example, referring to FIG. 8, a printing device 800 implementing an interpreter for a page description language, such as the PostScript® language, includes a microprocessor 802 for executing program instructions (including font instructions) stored on a printer random access memory (RAM) 804 and a printer read-only memory (ROM) 806 and controlling a printer marking engine 808. The RAM 804 is optionally supplemented by a mass storage device such as a hard disk. The essential elements of a computer are a processor for executing instructions and a memory. A computer can generally also receive programs and data from a storage medium such as an internal disk or a removable disk 812. These elements will also be found in a conventional desktop or workstation computer 810 as well as other computers suitable for executing computer programs implementing the methods described here, which can be used in conjunction with any digital print engine or marking engine, display monitor, or other raster output device capable of producing color or gray scale pixels on paper, film, display screen, or other output medium. In one implementation, any of the microprocessor 802, the RAM 804, the ROM 806, and the printer marking engine 808 are physically located on a host computer that controls printing hardware.

The invention has been described in terms of particular embodiments. Other embodiments are within the scope of the following claims. For example, the steps of the invention can be performed in a different order and still achieve desirable results.

What is claimed is:

1. A system for processing graphical elements, comprising:
   means for receiving an original graphical element having an associated original type;
   means for blending at least part of the original graphical element and at least part of at least one other graphical element to produce a transformed graphical element having an associated transformed type, the transformed type being different than the original type;
   means for storing information about the original type for the original graphical element;
   means for processing the transformed graphical element using the stored information about the original type, wherein a rule applied when processing untransformed graphical elements having the original type differs from a corresponding rule applied when processing untransformed graphical elements having the transformed type, the transformed graphical element being processed using the rule applied when processing untransformed graphical elements having the original type; and
   means for creating a raster representation of the transformed graphical element based on the processing.

2. The system of claim 1, further comprising:
   means for storing information about a type associated with the at least one other graphical element.

3. The system of claim 1, further comprising:
   means for storing information about a colorspace and a color for the original graphical element.

4. The system of claim 1, further comprising:
   means for storing an original shape of the at least part of the original graphical element.

5. The system of claim 4, where storing the original shape includes storing the original shape as a path of the at least part of the original graphical element.

6. The system of claim 4, where storing the original shape includes storing the original shape as a text glyph of the original graphical element.

7. The system of claim 4, where processing includes locating one or more edges in the transformed graphical element using the stored original shape.

8. The system of claim 1, where the transformed graphical element is a rasterized representation of the blended at least part of the original graphical element and at least part of the at least one other graphical element.

9. The system of claim 1, where storing information about the original type includes storing information about the original type in an invisible graphical element.

10. The system of claim 1, where storing information about the original type includes storing information about the original type in an XML element.

11. The system of claim 1, where processing includes trapping the transformed graphical element.

12. The system of claim 11, where trapping includes using a path of the transformed graphical element to represent a path of the at least part of the original graphical element.

13. The system of claim 11, where trapping includes using a color of the transformed graphical element to calculate a color of a trap element.

14. The system of claim 11, where trapping includes using trapping rules that depend on the stored information about the original type.

15. The system of claim 1, where processing includes halftoning the transformed graphical element.

16. The system of claim 1, where blending includes flattening at least part of the original graphical element and at least part of the at least one other graphical element to produce the transformed graphical element.

17. The system of claim 1, where:
   at least one of the original graphical element and the at least one other graphical element is a transparent graphical element; and
   the transformed graphical element is an opaque graphical element.

18. The system of claim 1, where:
   the original graphical element was produced by blending two or more previous graphical elements; and
   storing information about the original type includes storing information about a type associated with at least one of the previous graphical elements.

19. The system of claim 1, where the original type comprises a member of a set of types, the types in the set of types including raster, vector stroke, vector fill, image mask, soft mask, glyph, and gradient.

20. The system of claim 1, where the transformed type is raster.

21. The system of claim 1, where the original type is not associated with the transformed graphical element.

22. The system of claim 1, where:
   the original type is one of vector stroke and vector fill;
   the transformed type is raster;
   blending includes flattening at least part of the original graphical element and at least part of the at least one other graphical element to remove transparency; and
   processing the transformed graphical element using the stored information includes trapping the transformed graphical element by applying one of a vector stroke trapping rule and a vector fill trapping rule, the vector stroke trapping rule and the vector fill trapping rule differing from a raster trapping rule.

23. A computer-implemented method for processing graphical elements, the method comprising:
   receiving, in one or more computers, an original graphical element having an associated original type;
   blending, in the one or more computers, at least part of the original graphical element and at least part of at least one other graphical element to produce a transformed graphical element having an associated transformed type, the transformed type being different than the original type;
   storing, in the one or more computers, information about the original type for the original graphical element;
   processing, in the one or more computers, the transformed graphical element using the stored information about the original type, wherein a rule applied when processing untransformed graphical elements having the original type differs from a corresponding rule applied when processing untransformed graphical elements having the transformed type, the transformed graphical element being processed using the rule applied when processing untransformed graphical elements having the original type; and
   creating, in the one or more computers, a raster representation of the transformed graphical element based on the processing.

24. A computer storage medium encoded with a computer program, the computer program comprising instructions that when executed by data processing apparatus cause the data processing apparatus to perform actions comprising:
- receiving an original graphical element having an associated original type;
- blending at least part of the original graphical element and at least part of at least one other graphical element to produce a transformed graphical element having an associated transformed type, the transformed type being different than the original type;
- storing information about the original type for the original graphical element;
- processing the transformed graphical element using the stored information about the original type, wherein a rule applied when processing untransformed graphical elements having the original type differs from a corresponding rule applied when processing untransformed graphical elements having the transformed type, the transformed graphical element being processed using the rule applied when processing untransformed graphical elements having the original type; and
- creating a raster representation of the transformed graphical element based on the processing.

* * * * *